Sept. 8, 1953  M. A. RICHARDSON  2,651,158
TRACTOR-MOUNTED CORN HARVESTER
Filed Oct. 30, 1947  8 Sheets-Sheet 1
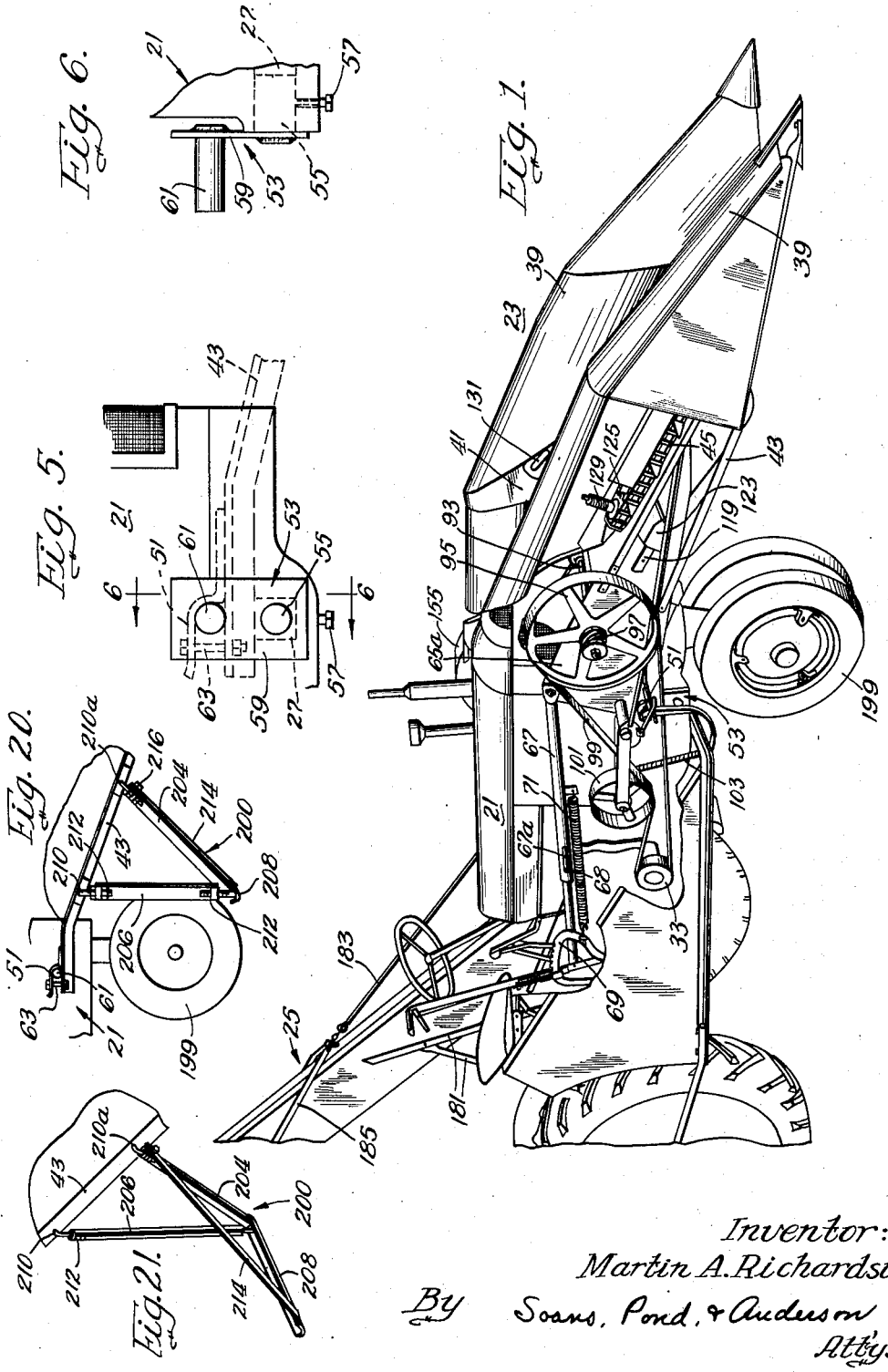
Inventor:
Martin A. Richardson
By Soans, Pond, & Anderson
Attys.

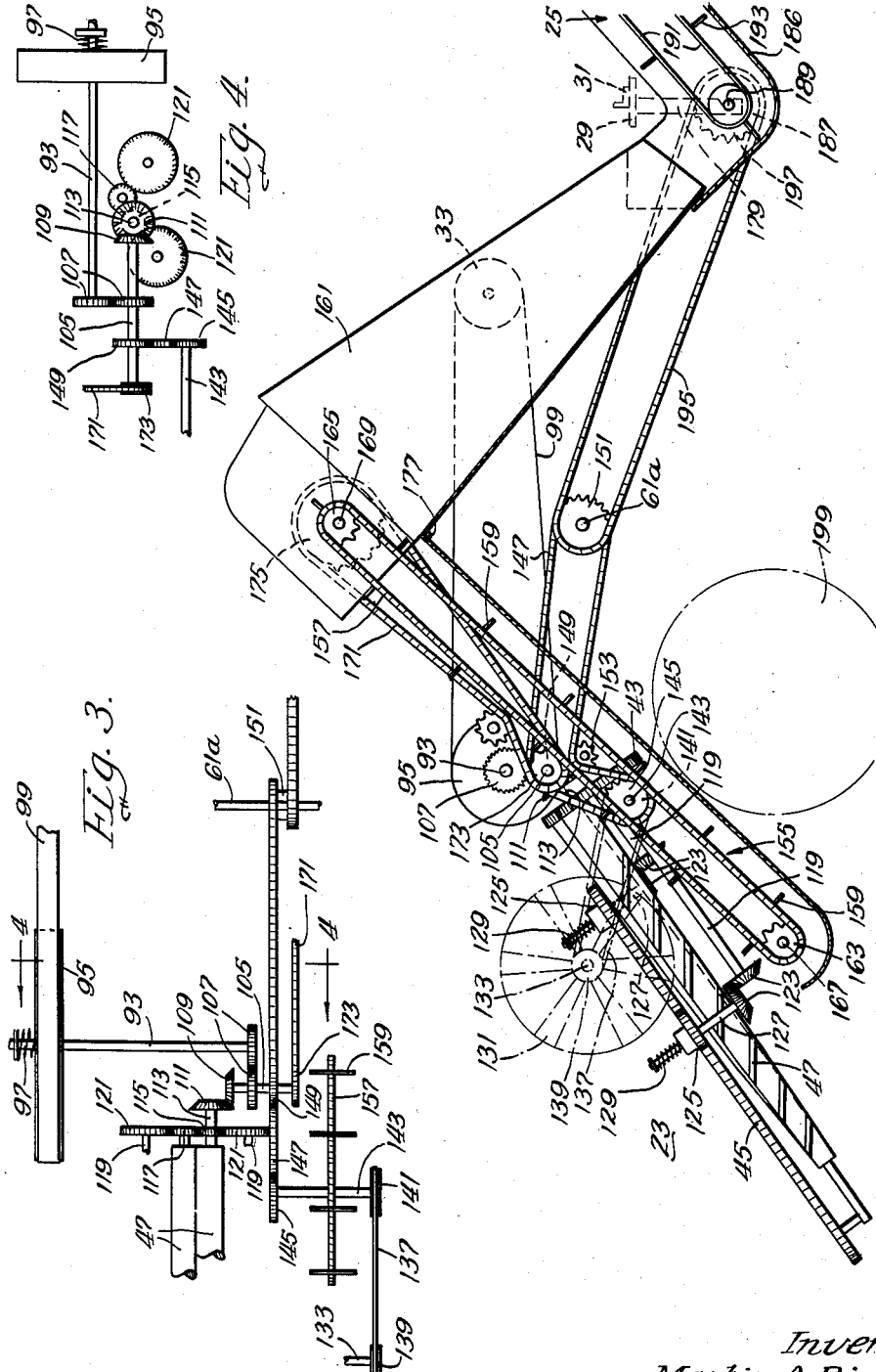

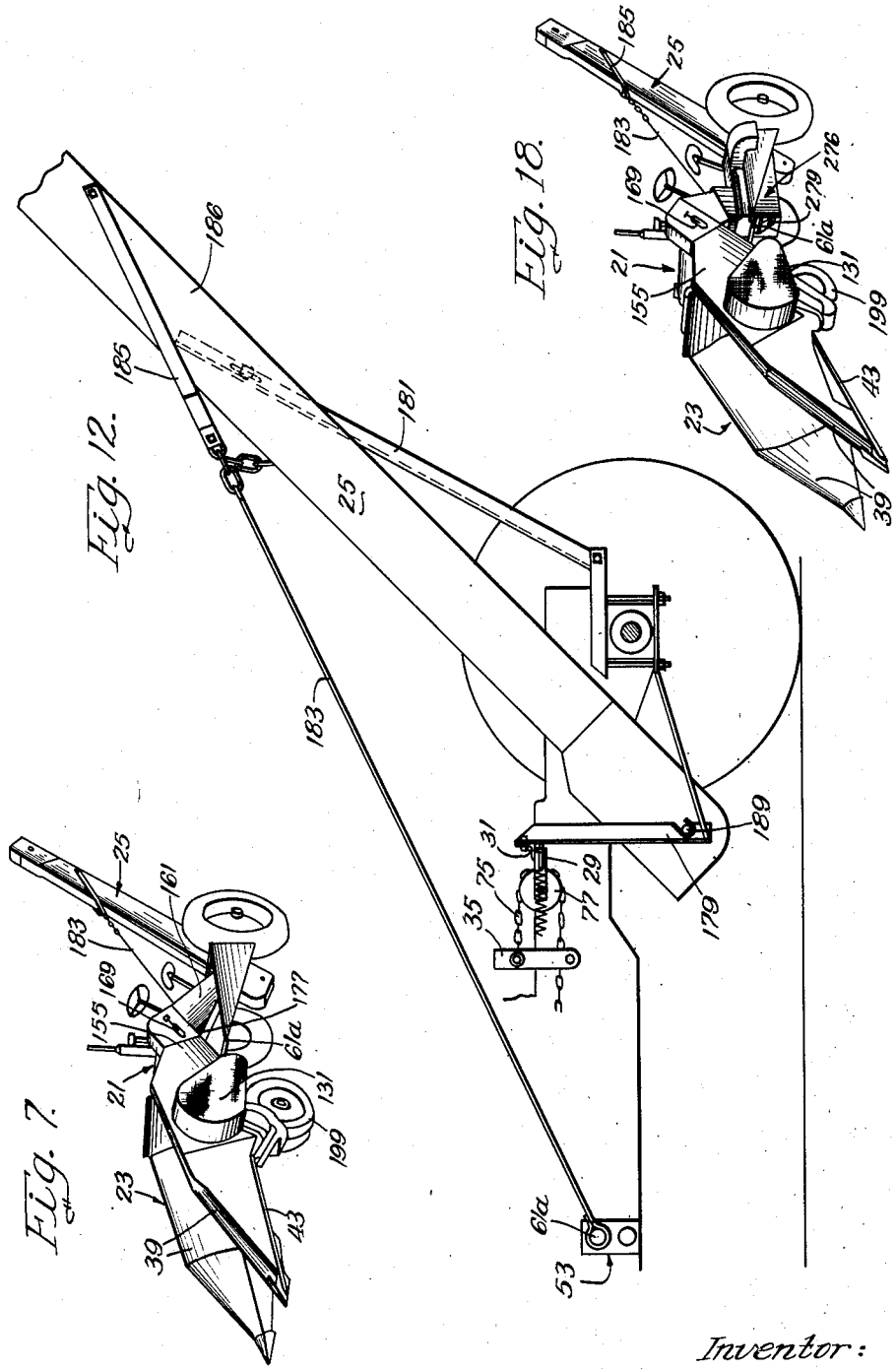

Sept. 8, 1953 — M. A. RICHARDSON — 2,651,158
TRACTOR-MOUNTED CORN HARVESTER
Filed Oct. 30, 1947 — 8 Sheets-Sheet 4

Inventor:
Martin A. Richardson
By Soans, Pond, & Anderson
Attys.

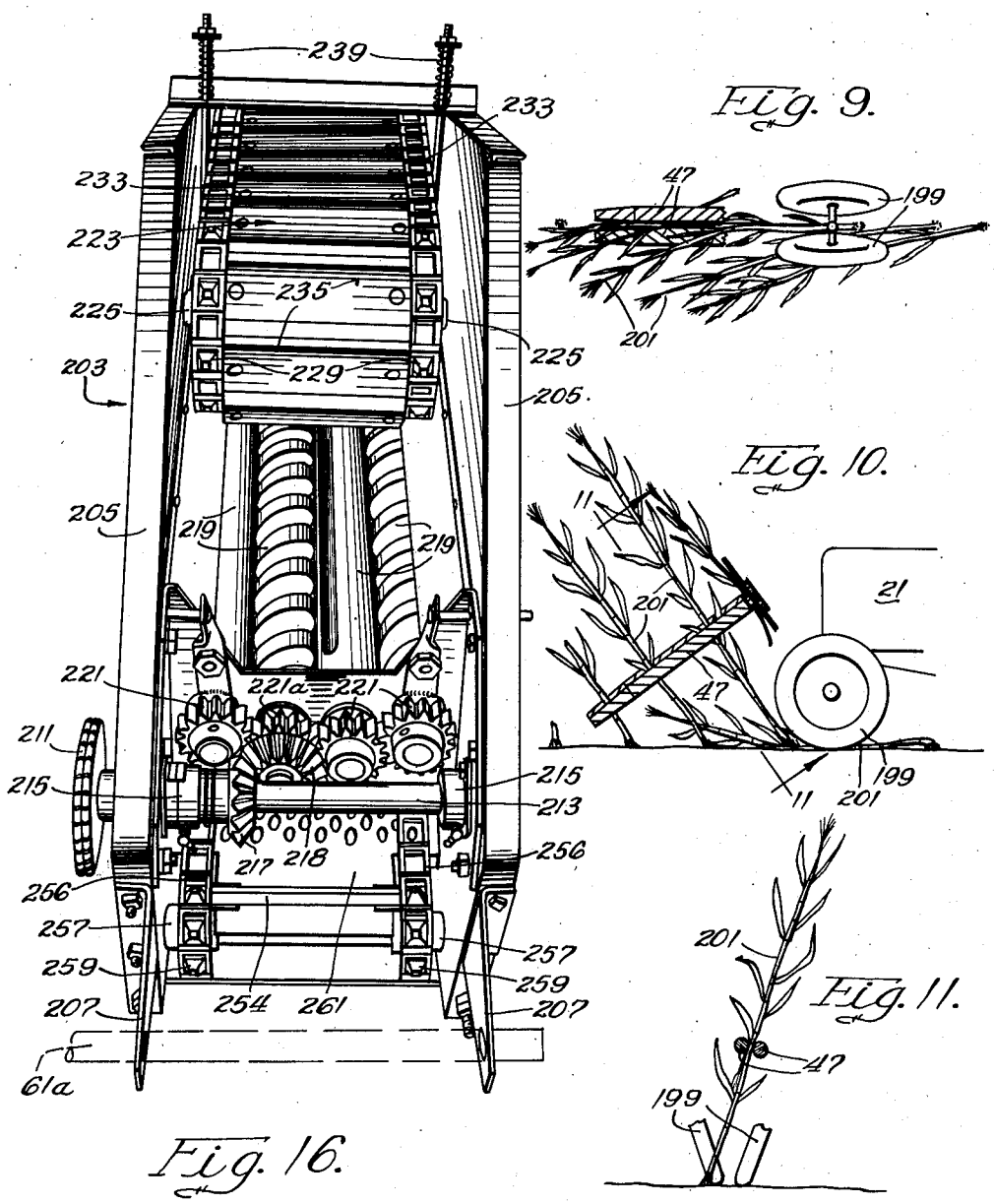

Sept. 8, 1953  M. A. RICHARDSON  2,651,158
TRACTOR-MOUNTED CORN HARVESTER
Filed Oct. 30, 1947  8 Sheets-Sheet 6
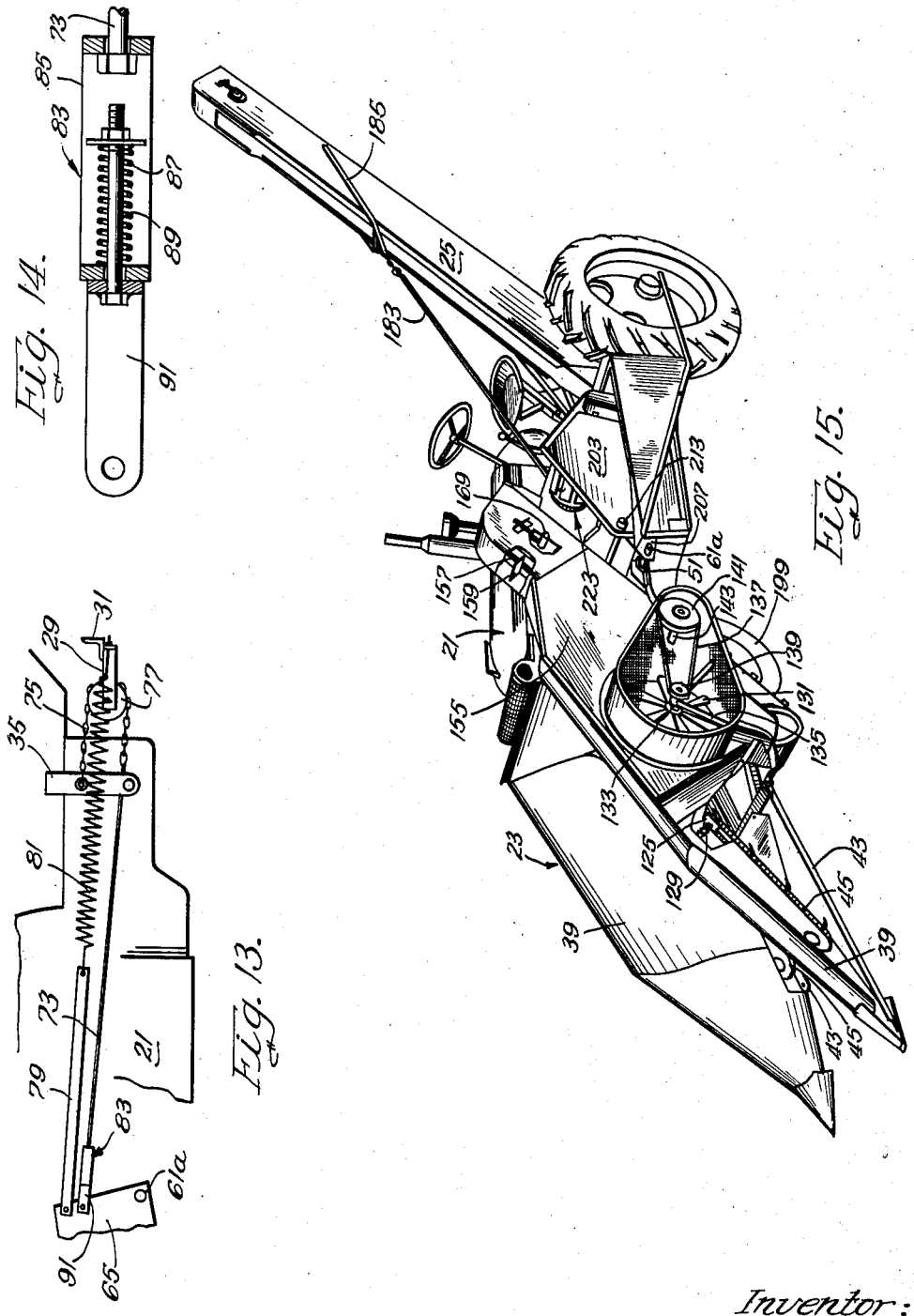
Inventor:
Martin A. Richardson
By Soans, Pond & Anderson
Attys.

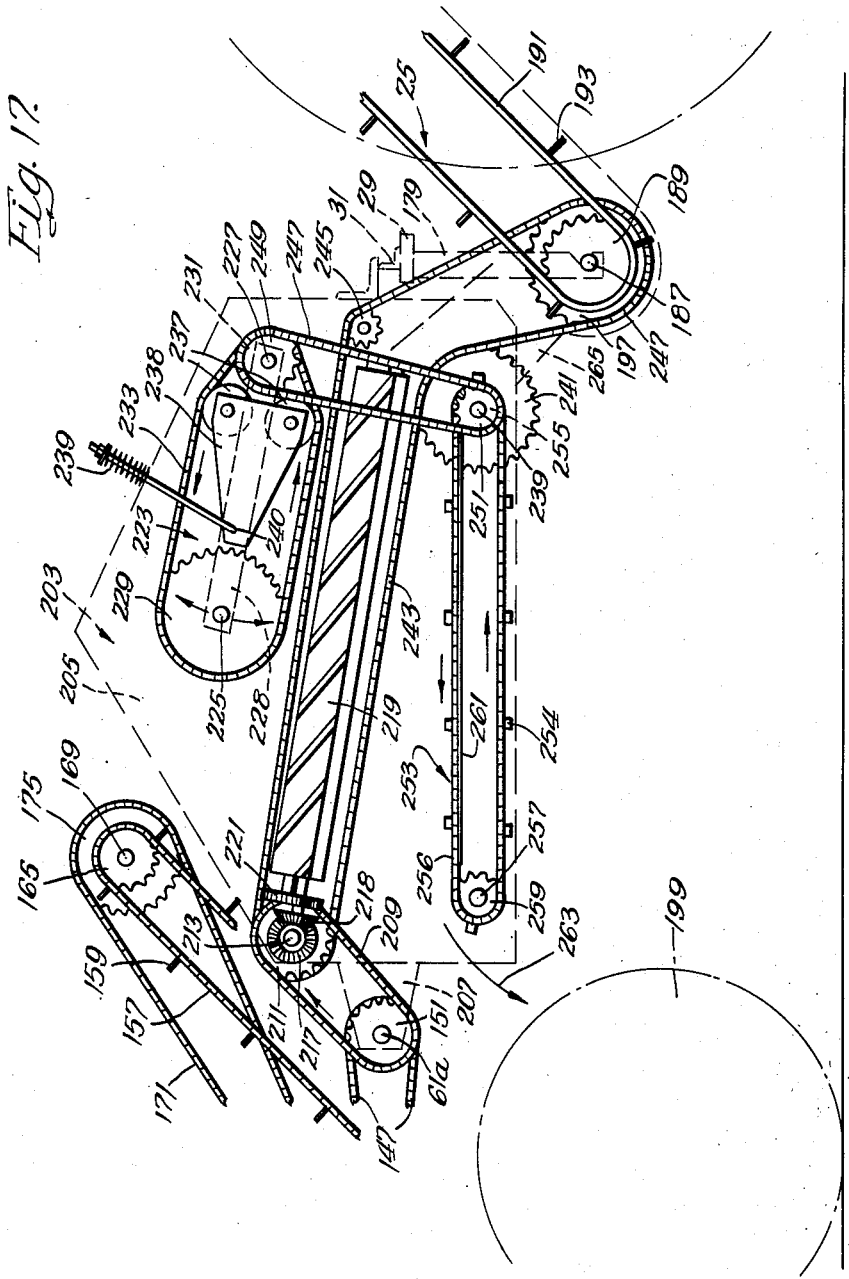

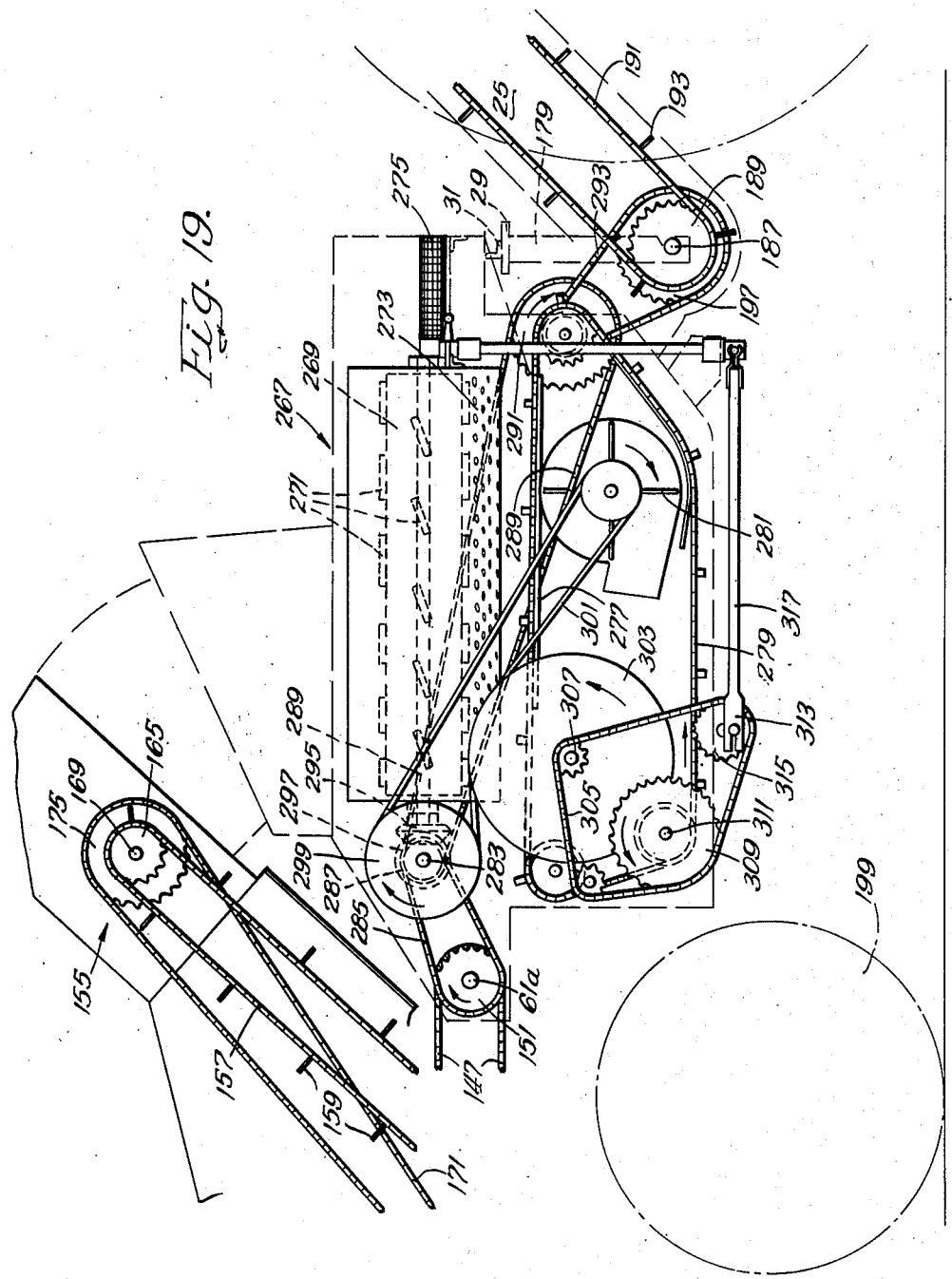

Patented Sept. 8, 1953

2,651,158

UNITED STATES PATENT OFFICE 2,651,158

TRACTOR-MOUNTED CORN HARVESTER

Martin A. Richardson, Racine, Wis., assignor to J. I. Case Company, Racine, Wis., a corporation of Wisconsin Application October 30, 1947, Serial No. 783,029

3 Claims. (Cl. 56—18)

The present invention relates generally to corn harvesters and, in particular, to a demountable corn harvester which is adapted to be supported upon and powered from a tractor.

Heretofore, tractor supported corn harvesters have been unwieldy and somewhat difficult to operate. Most of the known machines have the corn picking mechanism disposed on one or both sides of the tractor. Side mounted picking mechanisms make it difficult to properly guide the implement in the field, and the complicated supporting means necessary to such a mounting makes the dismantling of the apparatus a laborious and time consuming operation. The construction of the prior art implements also made it difficult to "open" or "clear" a field without knocking down much of the corn in the rows adjoining the entering row, with resultant damage to a considerable portion of the "downed" ears, and the further objection that the salvage of this corn required hand picking. In a small field, the damage that results when opening the field for picking may destroy a large portion of the yield of the field and reduce materially the profit from the crop.

The difficulties encountered in demounting the prior picking devices from the tractors with which such devices are used has had the further undesirable effect of restricting the use of mounted corn pickers to large farms having a number of tractors. On a small farm, at times it is desirable, depending upon the crop and weather conditions, to pick corn in the forenoon and, in the afternoon, to use the same tractor for hauling material or for other purposes. With the prior art tractor-supported pickers, such flexibility is not possible.

Under the proper conditions of the crop it may be desirable to husk or to shell the ears of corn at the same time they are picked in the field. The desirable operation will vary from day to day, and it is desirable that a corn picker be easily adapted to all of these operations. The prior art apparatus has had provisions for auxiliary husking and shelling attachments, but such attachments are both expensive to buy and complicated to install, and thus their use has been restricted.

The principal object of the present invention is to generally improve corn picking apparatus of the class described. A more specific object of the invention is to provide a light-weight corn picking apparatus, adapted to be supported upon and powered from a small tractor, the arrangement being such that the apparatus can be easily and rapidly attached to the tractor, when it is desired to pick corn, and can be easily and rapidly demounted from the tractor when the apparatus is not needed. A further object of the invention is to provide economical interchangeable processing elements which will allow added flexibility and efficiency of operation in a tractor-supported corn picker. Other objects and advantages of the invention will be apparent by reference to the following description and the accompanying drawings:

In the drawings:

Fig. 1 is a perspective view of the righthand side of a tractor with parts broken away having supported thereon a corn harvesting apparatus in accordance with the invention;

Fig. 2 is a view with parts in section of the drive mechanism taken from the lefthand side, of the apparatus illustrated in Fig. 1;

Fig. 3 is a fragmentary, plan view of the drive mechanism illustrated in Fig. 2;

Fig. 4 is a fragmentary, diagrammatic view taken on line 4—4 in Fig. 3;

Fig. 5 is an enlarged fragmentary, side elevational view of a part of the supporting means for the picking unit;

Fig. 6 is an elevational view taken on line 6—6 of Fig. 5;

Fig. 7 is a perspective view drawn to a smaller scale of the lefthand side of the apparatus illustrated in Fig. 1;

Figure 8:
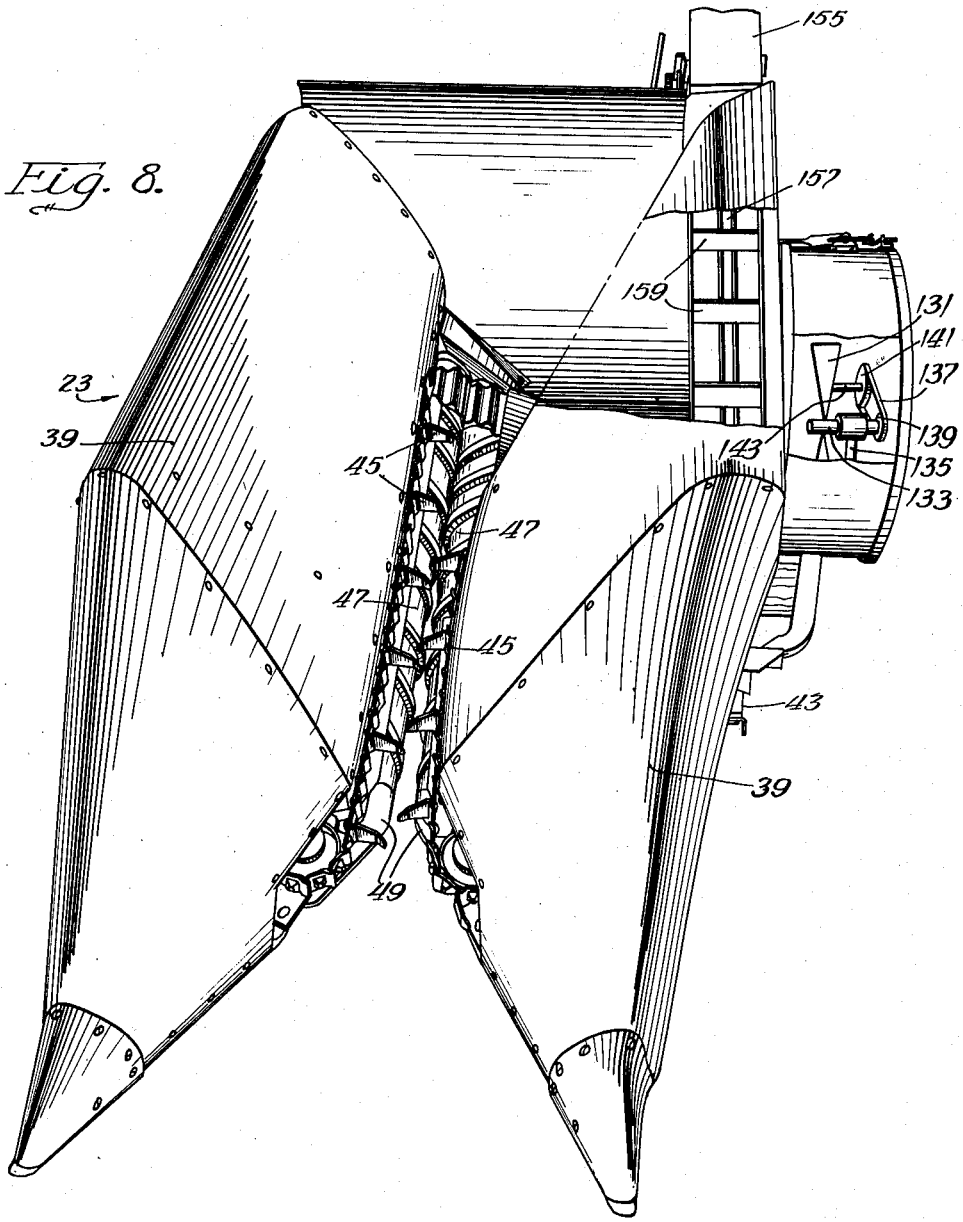
Fig. 8 is a perspective view with parts broken away of the picking mechanism of the invention.

Figs. 9, 10, and 11 are diagrammatic views drawn to a smaller scale illustrating the operation of a corn picker in accordance with the invention;

Fig. 12 is a fragmentary, side elevational view of the structural members supporting the wagon elevator which forms a part of the apparatus illustrated in the preceding figures;

Fig. 13 is a side elevational view showing certain features of the height adjusting means of the apparatus;

Fig. 14 is an enlarged sectional view of the shock absorber which is a part of the apparatus illustrated in Fig. 13;

Fig. 15 is a perspective view with parts broken away of the lefthand side of a tractor-supported corn picker in which is incorporated a husking unit;

Fig. 16 is an enlarged perspective view of the husking unit illustrated in Fig. 15;

Fig. 17 is an enlarged side elevational view illustrating the means for supporting the husking unit on the tractor and the means employed for driving the husking unit;

Fig. 18 is a perspective view drawn to a smaller scale of the lefthand side of a tractor-supported corn picker in accordance with the invention having incorporated therein a corn sheller;

Fig. 19 is an enlarged elevational view showing the method employed to support the corn sheller on the tractor, and illustrating the drive means employed for the various sheller elements;

Fig. 20 is a fragmentary elevational view showing a novel lift jack which facilitates the operation of dismounting the picking unit; and Fig. 21 is a perspective view of the lift jack illustrated in Fig. 20.

The corn picking apparatus of the invention is supported upon the tractor with which it is used so as to extend forwardly and downwardly from the front thereof. This is an important feature of the invention and is a substantial departure from the usual prior art practices. The tractor illustrated at 21 is of the tricycle type, and the forward wheel unit operatively cooperates with the corn picking apparatus during use, as will be hereinafter described. The apparatus is adapted to be powered from the power take-off pulley provided at one side of the tractor. The support means is so arranged that the position of the corn picking apparatus can be readily adjusted in a vertical plane, and means are provided whereby the corn picking apparatus can be readily attached to or removed from the associated tractor.

The corn picking apparatus includes a packing unit 23 for stripping the ears of corn from the stalks, an elevator unit 25 for elevating the ears to a trailing wagon, and means intermediate the picking unit and the elevator for conveying the picked ears from the picking unit to the elevator. The intermediate means is interchangeable with a husking unit and a corn shelling unit so that the material delivered to the elevator 25 may be ears of corn as stripped from the stalks, husked ears, or shelled corn.

The corn picking apparatus of the invention is adapted to be supported upon any of the tractors that are commonly used about a farm. The tractor 21 is of the lighter, single plow type, and is provided with a conventional forwardly located, multi-sided tool or cultivator bar receptacle 27 which is employed to support the corn picking unit 23 of the apparatus. The tractor 21 is also provided with a conventional, intermediate tool bar supporting member 29 to which a structural member 31 is rigidly attached, as illustrated in Fig. 12, to provide the necessary support for the lower end of the elevating unit 25.

On the illustrated tractor 21, the power take-off or belt pulley 33 is located on the righthand side of the tractor. If the power take-off pulley 33 is located on the opposite side, a picking apparatus constructed as a mirror image of the one to be described may be utilized.

The tractor 21 is provided with a hydraulic lift mechanism having a movable lifting arm 35 (Figs. 12 and 13) which is connected to the picking unit 23, in order that the picking unit 23 can be raised and lowered mechanically. On tractors which have no hydraulic lifting mechanism the picking unit 23 may be positioned vertically by means of a manual adjustment, which will be hereinafter described.

The corn picking unit 23, in accordance with the invention, includes a pair of spaced-apart, forwardly extending gathering points 39 which are fabricated from suitable sheet material. The forward ends of the gathering points 39 define a stalkway, and the rearward portions of the gathering points form a trough having an opening 41 in one side which allows the corn which is stripped from the stalks to pass outward into an ear conveying mechanism. The gathering points 39 are supported upon a frame 43 which is fabricated from suitable structural members. The frame 43 also supports a pair of gathering chains 45 which are disposed in runs along the lower edge of the gathering points 39. The gathering chains 45 effectively move the stalks of corn being picked rearwardly until they are engaged by the ear snapping means.

The snapping means comprises a pair of conventional snapping rolls 47 which extend upwardly and rearwardly as illustrated. The rolls 47 are supported by bearings 49 which are attached to the frame. In accordance with the usual practice the snapping rolls 47 are positioned in substantially parallel relation and one of the rolls is disposed somewhat higher than the other. The entire picking unit 23 is adapted to be connected to the tractor 21, by means of a pair of bifurcated clamps 51 (Fig. 5). The clamps 51 are adapted to be connected to supporting members 53 which fit within the forward tool bar receptacles 27 of the tractor 21.

Each of the supporting members 53 includes a stub shaft 55 which is shaped to fit within the multi-sided opening 27 provided in the tractor 21 for the usual forward tool bar. The stub shaft 55 may be rigidly clamped in the tool bar opening 27 by means of a set screw 57, as illustrated. A vertically extending web portion 59 is integrally attached to each of the stub shafts 55, and to this web 59 is integrally joined an outwardly extending supporting rod 61. The supporting rod 61 is desirably round, so as to provide for free adjustment of the height of the gathering points 39 and to provide a journal section for the idler bearings, of the drive mechanism as will be described in a subsequent paragraph. The supporting rod 61a on the lefthand side of the tractor 21 is elongated so as to provide the necessary space for supporting auxiliary apparatus, conveyors, and idlers, as will be described. The bifurcated clamps 51 are held in place on the supporting rods 61 by means of clamping bolts 63 or the like (Fig. 5). On each side of the frame 43 for the gathering points, adjacent the bifurcated clamp connection to the tractor 21, there is provided a vertically extending web section (65 and 65a). Each of the web sections is fabricated from a suitable metal plate and is drilled with suitable holes for connecting the gathering point frame 43 with the elevating and positioning means provided. Since the vertical height of the webs 65 and 65a determines the relative force necessary to position the gathering points 39 it is desirable to proportion the web sections so that each extends at least 10 to 12 inches above the pivot point, the supporting rod 61.

In the apparatus illustrated, the uppermost portion of the righthand web 65a is connected to a rearwardly extending rod 67 whose other end is connected to the movable arm of a quadrant adjusting unit 69, rigidly attached to the tractor 21. The quadrant unit 69 fixes the lowermost position of the gathering points 39 during the operation of the implement. The rod 67 is provided with a coiled counterbalancing spring 71 connected to the tractor 21, which is adjusted to balance the weight, or a large portion of the weight, of the gathering points 39. In order to allow for the elevation of the gathering points 39 by the hydraulic means without repositioning the quadrant 69, the rod 67 is fabricated from a pair of tubular members, one of which is proportioned to slide freely within the other. The tubular members are held together by a pin 68, which slides freely in a slot 67a so as to permit vertical movement of the gathering points 39. This structure constitutes a lost motion positioning means.

The lefthand web 65 is connected, by means of a rod 73 and a chain 75 which extends around a reversing pulley 77 on the tractor 21, to the adjusting arm 35 of the hydraulic lift mechanism (Fig. 13). The web 65 is also connected to the tractor by a counterbalance which includes a second rod 79 and coiled spring 81. A shock absorber 83 is desirably provided between the hydraulic lifting mechanism and the web 65 to prevent sudden shocks when the gathering points 39 are raised to their maximum elevation. The shock absorber 83 may include a saddle member 85 on which there is supported a spring 87 which is connected by means of a rod 89 and a U shaped strap member 91 to the web 65 (Fig. 14).

The drive means for the picking unit 23 (Figs. 2, 3, and 4) constitutes an important feature of the present invention. A cross shaft 93 is journaled into bearings attached to the webs 65 and 65a, which are integrally attached to the frame 43 of the gathering points 39. The end of the shaft 93, which is on the righthand side of the machine, is provided with a pulley 95 which connects with the shaft through a suitable jump clutch 97. A belt 99 connects the pulley 95 with the power take-off pulley 33 on the tractor 21. In order to provide the various lengths of drive belt necessary to permit the gathering points 39 to be adjusted relative to the tractor 21, the belt 99 is over-length and is tensioned by means of a belt tightener pulley 101 which is hingedly attached to the web 65a on the gathering point frame 43 (Fig. 1). The belt tightener 101 extends rearwardly and engages the upper run of the belt 99 against which it is biased by means of a coil spring 103 which is connected to the tractor 21.

The other end of the cross shaft 93 (at the lefthand side of the implement) is operatively connected to a stub shaft 105, which is journaled in bearings on the gathering point frame 43, by means of a pair of inter-meshing pinion gears 107. The righthand end of the stub shaft 105 is provided with a bevel gear 109 which meshes with a bevel gear 111 on a shaft 113 journaled on the frame 43. The shaft 113 is directly connected to one of the snapping rolls 47. A pinion gear 115 on the shaft 113, intermediate the bevel gear 111 and the snapping roll 47, meshes with a second pinion gear 117 which is attached to the shaft of the second snapping roll 47. The intermeshing gears 115 and 117 cause the two snapping rolls 47 to rotate in opposite directions, which effectively strips the ears from the stalks engaged therebetween.

A pair of forwardly extending shafts 119 are journaled into bearings disposed on the gathering point frame 43, and are adapted to transmit power to the gathering chains 45. Pinion gears 121 are attached to the shafts 119 at their rearward end and mesh with the snapping roll drive gears 115 and 117. Cooperating bevel gears 123 at the forward end of each of the shafts 119 transmit power to the gathering chains 45. The gathering chains 45 are driven by means of sprockets 125 which engage the gathering chains 45. The sprockets 125 are supported upon generally vertically extending shafts 127, whose lower end is operatively connected with the bevel gears 123. The drive sprockets 125 are each provided with a conventional, over-running or jump clutch 129, so that in the event the gathering chains 45 become clogged no damage will result to the remainder of the mechanism.

A fan 131 is provided adjacent the opening 41 in the side of the gathering points 39 to blow trash and dirt from the ears as they are snapped from the stalks. The fan 131 is supported upon a shaft 133, which is journaled into a bracket 135 on the gathering point frame. The fan 131 is driven by means of a V belt 137 which connects a pulley 139 on the fan shaft 133 with a pulley 141 supported on a transversely extending shaft 143 which is journaled into bearings on the frame 43. A sprocket 145 on the inner end of the transversely extending shaft 143 is connected by means of an endless chain 147 to a sprocket 149 on the stub shaft 105. This same chain 147 extends around a multiple sprocket idler 151 which turns freely upon the lefthand supporting rod 61a, which is a part of the main support means for the picking unit. A suitable chain tightener 153 is provided to tension the chain 147.

The ears which are snapped from the stalks fall past the fan 131 into a well which is provided with a conventional, generally rearwardly extending, flight type elevator 155 which includes a chain 157 having metal flights 159 attached thereto for drawing the ears of corn upward to a conveying chute 161. The chain 157 is supported upon sprockets 163 and 165 which are attached to shafts 167 and 169 which are rotatably journaled into bearings on the frame 43. The conveying elevator 155 is completely enclosed by a metal shell which protects the operator from the hazards of the moving flights and maintains the ears of corn in the elevator. The elevator 155 is driven by means of an endless chain 171, which connects a sprocket 173 on the outer end of the stub shaft 105 with a sprocket 175 attached to the upper elevator supporting shaft 169 (Fig. 2).

The chute 161 extends rearwardly and downwardly and connects the upper end of the conveying elevator 155 with the wagon elevator 25 which is supported at the rear of the tractor 21. The chute 161 is connected to the conveying elevator 155 by means of the hinge 177 so that it automatically adjusts itself to varying angles when the height of the gathering points 39 is changed. The ears which are conveyed upwardly by the conveying elevator 155 fall into the chute 161 and slide into the wagon elevator 25, which conveys them upwardly and rearwardly to a discharge point over a wagon which trails behind the tractor 21 to receive the picked ears (Figs. 2 and 7).

The wagon elevator 25 moves the ears of corn from the chute 161 to a discharge point over a trailing wagon. The wagon elevator includes a protective casing 186 within which runs a flight type conveyor.

The wagon elevator 25 is supported at its lower end upon a pair of downwardly extending, hook-shaped members 179 which are attached to the intermediate tool bar support 29 on the tractor 21. The upper end of the elevator 25 is held in position by a pair of compression members 181 which adjustably connect the casing 186 with the frame of the tractor. Additional rigidity is provided by means of a forwardly extending guy member 183 which connects a yoke 185 on the casing 186 with the forward supporting web 53 which adjustably supports the elevator 25 at the desired height.

The flight type conveyor includes a sprocket 187 attached to a shaft 189 rotatably supported at the lower end of the casing 186, and a sprocket (not shown) attached to a shaft which is rotatably supported at the upper end of the casing 186. An endless chain 191 is disposed about the sprockets and a plurality of metal flight members 193 are rigidly attached to the chain 191 to lift the ears of corn upwardly to a point where they may fall into the wagon. The wagon elevator 25 is driven from the multiple-idler sprocket 151 on the rod 61a of the picking unit supporting bracket 53 by means of an endless chain 195 which engages a sprocket 197 attached to the inner end of the lower elevator shaft 189. A clutch (not shown) adapted to be controlled by the operator of the implement, is provided on the shaft 189 to selectively engage it with the sprocket 197 so that the elevator may be disengaged when the implement is being turned and when the wagon is not disposed below the elevator outlet.

During the operation of the apparatus in a field the stalkway between the gathering points 39 is aligned with the row of corn to be picked and the tractor 21 is moved forwardly along the row. The stalks are gathered into the snapping rolls by means of the gathering chains 45 which are disposed along the lower portion of the gathering points. The snapping rolls 47 which are disposed with their axes at different levels, as heretofore described, snap the ears from the stalks and cause them to fall down the chute 41 into the conveying elevator 155. Any trash or dirt which may come free from the ears or stalks during the snapping operation is blown out of the chute and the space between the gathering points 39 by the current of air produced by the fan 131. The ears are elevated by the conveying elevator 155 until they fall into the rearwardly extending connecting chute 161 which directs them into the wagon elevator 25, and the wagon elevator 25 conveys the ears upwardly and rearwardly for discharge into the trailing wagon.

The various parts of the picking mechanism are so proportioned that particularly efficient operation of the corn picking unit results when the unit is supported upon a tractor having a unitary forward truck, as illustrated at 199 in Figs. 9, 10, and 11. As shown in the head-on view Fig. 11, the snapping rolls 47 tilt each stalk 201 sideways as it passes rearwardly in relation to the gathering points. At the same time, the lower portion of the stalk is held in place by the passage of the forward truck 199 of the tractor 21 over its base. The rotating wheels of the truck 199 thus pull the stalks downwardly between the snapping rolls 47 and reduce the possibility of the rolls becoming clogged by too rapid feeding.

When it is desired to detach the corn picking apparatus and use the tractor for other purposes, it is merely necessary to remove the picking unit 23 from the tractor 21. The picking unit 23 may be easily removed by raising the rear portion of the gathering point frame 43 enough to remove the weight from the bifurcated clamps 51. This may be done by blocking up the rear end of the picking unit, or more conveniently, it can be effected by the use of special lift jacks 200 such as are illustrated in Fig. 20. The bolts 63 on the bifurcated clamps 51 are then removed; the drive chain 147 to the multiple idler 151 on the supporting rod 61a is detached; the belt 99 which provides the power for the unit is removed from its pulleys 33 and 95; and the bolts which secure the counterbalancing rods 67, 79 and 73 to the forward webs 65 and 65a are removed. It is then necessary only to back the tractor 21 away from the picking unit 23, which detaches the gathering points 39, the conveying elevator 155, and the various drive members from the tractor 21. If the special lift jacks 200 are used, it is possible to adjust accurately the height of the bifurcated clamp 51, so as to permit convenient disengagement and re-engagement of the supporting members. The wagon elevator 25 may be removed, if desired, by releasing the bolts on the supporting members 181 and 183, and lifting it from the hook-shaped yoke 179 which supports the lower end. This, however, is not necessary for ordinary farm use, as the elevator 25 does not extend beyond the normal track of the tractor 21.

In order to provide connections for the lift jacks 200, each side of the gathering point frame 43 is provided with a pair of spaced apart holes which are proportioned to enage the upper portions of the lift jacks. The lift jacks (Figs. 20 and 21) include a pair of upwardly extending, supporting members 204 and 206 which are hingedly connected at their lower ends to the inner surfaces of an outwardly extending U-shaped channel member 208 so as to permit the three members to be folded together. The upper end of each of the members 204 and 206 is provided with a hook 210 and 210a which is adapted to be engaged in the holes in the frame 43. One of the supporting members 206 includes a turnbuckle mechanism 212, so as to allow the adjustment of the lift jack 200 to various effective heights. The U-shaped member 208, extends outwardly along the ground in a direction normal to the plane of the members 204 and 206, so as to prevent the picking unit 23 from tipping over. The jack structure is reinforced by a stiffening member 214 which is hingedly connected to the outer end of the U-shaped member 208 and detachably connected to the supporting member 204 by means of a bolt 216. The stiffening member 214 is desirably attached to one of the outer surfaces of the member 208 so that the vertically extending members 204 and 206 can be folded within the channel member 208 so as to make a compact unit which is adapted for storage in a confined space.

Lift jack 200, in accordance with the invention, permits accurate and rapid adjustment of the height of the rear portion of the gathering point frame 43. The jack may be conveniently attached by merely engaging the hooks 210 and 210a in the holes in each side of the frame 43 while the picking unit 23 is in the raised position, and then lowering the picking unit by means of the adjusting mechanism so as to remove the weight of the picking unit 23 from the bifurcated clamps 51. The construction of the lift jack 200 allows it to be collapsed into a small space so that it can be stored in the tractor tool box, but it provides a rigid jacking structure when the stiffening member 214 is in position.

The novel structural combinations of the invention co-operate to provide a corn harvester which may be easily controlled by the operator, and which may be easily and rapidly mounted or demounted upon a tractor, especially when used in combination with the novel lift jacks, previously described. The use of a single pair of gathering points, arranged to provide a stalkway which aligns with the center line of the tractor, greatly facilitates the use of the apparatus, and permits the installation of the corn picking apparatus upon a tractor without requiring the widening of the wheel track or other change in the characteristics of the tractor. The relatively narrow construction allows the use of the implement in small fields, where there would not be a sufficient turning area for larger pickers. In addition, it enables the implement to pass through narrow gates and facilitates its transport on the highway.

A husking apparatus which has proven especially satisfactory for use in combination with tractors and corn pickers, as above described, is illustrated at 203 in Fig. 15. The husking unit 203 comprises a frame 205 fabricated of suitable plate and angle structural members, and supported upon the supporting rod 61a which extends outwardly from the tractor. The frame 205 is connected to the rod 61a by means of a pair of forwardly extending arms 207. The other end of a husking unit 203 is supported upon the horizontal angle bar 31, which extends outwardly from the intermediate tool bar support 29. The inlet to the husking unit 203 is an opening in the frame 205 which is disposed directly below the outlet on the conveying elevator 155. The husking unit 203 takes the place of the chute 161, which has previously been described.

The drive for the husking unit 203 (Figs. 16 and 17) includes a chain 209 which connects the multiple idler 151 on the supporting rod 61a with a sprocket 211 which is attached to a cross shaft 213 journaled in suitable bearings 215 (Fig. 16) in the husker frame 205. A bevel gear 217 on the cross shaft 213 drives a bevel gear 218 on one of a plurality of husking rolls 219. In the apparatus illustrated, two sets of husking rolls 219 are shown (Fig. 16), each set preferably comprising one resilient, rubber-surfaced roll which is helically grooved, and one metal roll which is provided with spaced, longitudinal grooves. The grooved rolls are adapted to grip the husks of the ears as they move into contact therewith. The irregular, cooperating surfaces provided by the helical and longitudinal grooves move the ears rearwardly to the husking unit outlet, from which they fall into the wagon elevator 25. The individual husking rolls are driven by means of pinion gears 221 which mesh with a pinion gear 221a on the shaft of the driven roll, which is connected to the bevel gear 218.

The ears are maintained in close contact with the husking rolls 219 by means of a resiliently biased husking belt 223. The husking belt 223 is supported upon a pair of shafts 225 and 227 journaled into a frame 228. Suitable sprockets 229 and 231 are keyed to the ends of the shafts 225 and 227. The sprockets 229 and 231 engage a pair of chains 233 to which are attached a plurality of cross slats 235 which form the husking belt 223. The belt 223 is tensioned by means of a pair of rollers 237, which are rotatably supported in contact with the belt 223 by means of a pair of triangularly shaped plates 238. The plates 238 are pivotally joined to the frame 228 at the point 240. The arrangement is such that the rollers 237 maintain a constant pressure on the lower portion of belt 223. The pressure of belt 223 on corn being husked is adjustable and is determined by a pair of biasing springs 239 which act upon the frame 228, the latter pivoting about shaft 227. The rear supporting shaft 227 is journaled in the frame 205 of the husking unit 203 so as to permit free, vertical movement of the forward end of the husking belt 223.

A second cross shaft 239 (Fig. 17) is rotatably journaled into the frame 205 of the husking unit 203 at its rear, lower corner. The shaft 239 is provided with a sprocket 241 which is adapted to co-act with a chain 243 which engages the sprocket 211 on the forward cross shaft 213 and which extends around the sprocket 197 on the wagon elevator drive shaft 187. The chain 243 is provided with a suitable chain tightener 245 which is adjustably supported on the frame 205 of the husking unit. The husking belt 223 is operatively connected to the second cross shaft 239 by means of a chain 247 which operatively connects a sprocket 249 on the supporting shaft 227 of the husking belt 223 with a sprocket 251 on the second cross shaft 239.

A cross slat conveyor 253 is disposed below the husking rolls 219. The conveyor 253 is fabricated from a plurality of cross slats 254 which are held in place by chains 256. The rearward end of the conveyor 253 is supported upon sprockets 255 on the cross shaft 239, and the conveyor extends forwardly to another shaft 257 at the forward end of the husking unit 203, where it is supported upon sprockets 259. The upper run of the conveyor 253 contacts a flat, perforated, metal plate 261, which is supported upon the husker frame 205 as shown in Figs. 16 and 17.

In operation, the husks, and any shelled corn and other material which may fall through the husking rolls 219, falls downwardly onto the upper run of the slat conveyor 253, where it is moved forwardly to a discharge opening indicated by the arrow 263 in Fig. 17. As the husks and shelled corn are moved over the perforated plate 261 by the spaced slats 254, the shelled corn falls through the perforations onto the bottom of the casing for the husking unit 203. The shelled corn is carried from the bottom of the husking unit to a discharge chute 265 (Fig. 17) by the lower run of the conveyor. The discharge chute 265 opens into the wagon elevator 25 and any shelled corn is thus salvaged and delivered to the trailing wagon together with the husked ears.

When it is desired to remove the corn picking unit from the tractor 21, as described in a previous section, the housing unit 203 may be left in place on the side of the tractor without impairing the mobility and usefulness of the tractor. The husking unit 203 is arranged so that while it co-operates with the picking unit 23, when in place on the tractor, it is fully interchangeable with other processing units when conditions are such that it is desirable to operate without the husking unit. In this instance it is only necessary to remove the husking unit from its supports, to replace the rearwardly extending chute which forms a part of the simple picking unit, and to substitute the drive chain 195 to the wagon elevator 25 for the drive chain 243 which has been described in connection with the husking unit.

Under certain conditions of the crop, it is economical to shell the corn at the same time that it is picked. To make this possible, the corn harvester of the invention is constructed so that it will co-operate with a small shelling unit 267 (Figs. 18 and 19) which is similar in size, and which may be substituted for, the husking unit 203. The forward end of the shelling unit 267 is supported upon the supporting rod 61a which engages the tractor 21 and the rear end is supported on the intermediate tool supporting member 29 which has been described in connection with other elements of the apparatus.

For the purpose of a general understanding of the co-operative relationship between the corn harvester of the invention and the corn shelling apparatus 267, a brief description of the corn shelling apparatus follows:

The corn sheller 267 includes a frame which is fabricated from suitable plate and angle members and is proportioned to be supported upon the supporting members of the tractor 21. The shelling is accomplished by a rotating cylindrical member 269 which is provided with a plurality of projecting lugs 271 adapted to engage the ears of corn when the cylindrical member 269 is rotated. A generally semi-cylindrical, perforated plate 273 is supported on the frame and co-acts with the rotating shelling cylinder 269. The distance between the lowermost point of the shelling cylinder 269 and the perforated plate 273 is such that an ear of corn will be positively engaged by the lugs on the shelling cylinder 269 as it passes between the shelling cylinder 269 and the perforated plate 273. The lugs 271 on the cylinder 269 are so arranged that the husks and broken cob portions are positively moved to the rear of the apparatus where they are discharged over a vibrating screen 275.

The shelled corn and small pieces of cob fall downwardly onto a flat, perforated metal plate 277 and a cross slat type conveyor 279 co-acts with the plate 277 to move the material forwardly. A paddle-type blower 281 is disposed under the perforated plate 277, to provide a stream of air which blows the light cob material out of the shelling unit while permitting the kernels of corn to fall into the bottom of the shelling unit 267. The shelled corn is carried rearwardly to the wagon elevator 25 by means of the lower flight of the cross slat conveyor 279.

The drive for the shelling mechanism is similar to the drive employed in the husking unit 203 which has been heretofore described. A cross shaft 283 journaled in the forward portion of the sheller frame is operatively connected with the idler sprocket 151, on the supporting member 61a on the tractor 21 by means of a chain 285 which engages a suitable sprocket 287 on the cross shaft 283. A second sprocket on the cross shaft 283 is operatively connected by means of a chain 289 to a sprocket 291 on the rear of the shelling apparatus which is a part of the drive for the wagon elevator 25. The wagon elevator drive also includes a chain 293 which engages a sprocket keyed to the same shaft as sprocket 291 and the sprocket 197 on the wagon elevator 25.

The sheller cylinder 269 is rotated by means of a bevel gear 295 on its central supporting shaft which is operatively connected to the cross shaft 283 by means of a bevel gear 297 attached thereto. A pulley 299 on one end of the cross shaft 283 is connected by means of a double V belt 301 to the fan 281 which provides the air blast necessary to separate the broken-up cobs from the shelled corn. A large pulley 303, journaled on the side of the shelling unit 267, is engaged on the back of the double V belt, and is adapted to drive the cross slat conveyer 279 by means of a chain 305 which connects a sprocket 307 on the shaft for the pulley 303 with a sprocket 309 on the conveyer drive shaft 311. The vibrating screen 275 is connected to an eccentric 313 by means of a pitman and bell crank linkage 317. The eccentric 313 is driven from a sprocket 315 engaged by the chain 305.

The shelling unit which has been described may be left on the tractor when it is desired to use the tractor for other purposes, in the same manner as the husking unit. This sheller unit, in addition to being useful as a part of the complete tractor supported corn harvester, as described, may be used as a separate unit. It can be powered by a small auxiliary engine.

In the foregoing, there has been disclosed an improved single row corn picker and harvester, which can be quickly and easily attached to and removed from the tractor with which it is used. The arrangement of the gathering points, which provide a stalkway in alignment with the center line of the tractor, greatly facilitates the use of the implement. Moreover, this arrangement permits the snapping rolls to be positioned above the front wheels of a tricycle type tractor, in such relationship therewith that the tractor wheels will engage and pull the stalks through the snapping rolls during the operation of the implement.

Important novel features are incorporated into the support and drive mechanism. These make possible the use of various interchangeable processing units whereby the implement can be adapted for varying crop conditions. In addition, the novel support and drive means disclosed permit the removal of the picking unit without necessitating the removal of the other portions of the apparatus.

Various of the features of the invention believed to be new are set forth in the following claims.

I claim:

1. In combination with a tricycle type tractor having a front wheel support and having a power take-off and having laterally extending implement support means secured to opposite sides of the forward end of the tractor, a one-row corn picking unit comprising a generally rigid frame structure including frame members supporting a pair of forwardly extending snapping rolls and drive means therefore and including a pair of rearwardly-presented laterally-spaced members constituting the sole supporting connection with said tractor, said frame members each including a rearwardly facing clamping member fixed thereto in engagement with said implement support means on opposite sides of the tractor to position said snapping rolls in generally longitudinally aligned relation with said tractor, above and forwardly of the front wheel support of the tractor, said clamping members affording hinged movement of said corn-picking unit about the axis of said implement support means, power lift means on said tractor detachably pivotally connected with one of said frame members at a point vertically spaced from the hinge axis afforded by said implement support for swinging said picking unit about said hinge axis, a lost motion positioning means comprising a member having one end pivotally connected to one of said frame members in vertically spaced relation to said hinge axis and having its other end adjustably positionable on said tractor, said positioning means also affording a manual lift for said picking unit, and detachable driving connection between said snapping roll drive means and said power take-off comprising a flexible belt and an idler coacting therewith for maintaining said connection irrespective of the vertical position of said picking unit relative to the tractor.

2. In combination with a tricycle tractor having a front wheel support and a pair of cultivator bar receptacles disposed on opposite sides of and in oppositely facing relation on the forward portion of the tractor equidistant from the center line thereof, a stub member in each of said cultivator bar receptacles and extending laterally outwardly therefrom, a corn picking unit having a frame structure including spaced-apart gathering points defining a stalkway therebetween and a pair of laterally-spaced, rearwardly-extending frame members, each of said frame members having a rearwardly facing U-shaped clamping member fixed thereto and disposed on opposite sides of the longitudinal axis of said stalkway equidistantly therefrom, said clamping members engaging said stub members to position said frame structure forwardly of the front wheel support of the tractor and with the longitudinal axis of said stalkway aligned with said front wheel support, removable lock means for preventing inadvertent separation of said clamping members from said stub members, manual lost motion positioning means for said tractor comprising a quadrant mounted on said tractor, a lever arm pivotally supported on said quadrant, a rod connecting said lever arm with said frame structure in vertically spaced relation to said stub members and including a pair of elongated members slidably joined at adjacent end portions thereof for limited relative axial movement, and a power lift means comprising a lift arm having a yieldable connection with said frame structure in vertically spaced relation to said stub members, said lost motion positioning means coacting with said power lift means to determine the lowermost position of said corn picking unit.

3. In combination with a tricycle type tractor having a front wheel support and a power take-off and having a pair of cultivator bar receptacles disposed on opposite sides and in oppositely facing relation on the forward portion of the tractor equidistant from the center line thereof, a stub member disposed in each of said cultivator bar receptacles and extending laterally outwardly therefrom, a one-row corn picking unit comprising a generally rigid frame structure supporting a pair of forwardly extending snapping rolls and drive means therefor and including a pair of rearwardly-extending laterally spaced frame members, each of said frame members having a rearwardly facing U-shaped clamping member disposed on opposite sides of the longitudinal axis of said stalkway, said clamping members engaging said stub members to position said frame structure forwardly of the front wheel support of the tractor and with the longitudinal axis of said stalkway aligned with said front wheel support and affording hinged movement of said unit about the axis of said stub members on the tractor, removable locking means for preventing inadvertent separation of said clamping members from said stub members, a lost motion positioning means comprising a member having one end pivotally connected to one of said frame members in vertically spaced relation to one of said stub members and having its other end adjustably positionable on said tractor, said positioning means also affording a manual lift for said picking unit, lift means comprising a member having one end pivotally connected to said rigid frame structure in vertically spaced relation to said hinge axis of said stub members and having its other end adjustably positionable on said tractor, and a detachable driving connection between said snapping roll drive means and said power take-off comprising a flexible belt and an idler coacting therewith for maintaining said connection irrespective of the vertical position of said unit relative to the tractor.

MARTIN A. RICHARDSON.

References Cited in the file of this patent

UNITED STATES PATENTS

| Number | Name | Date |
|---|---|---|
| 1,660,767 | Ronning et al. | Feb. 28, 1928 |
| 2,015,708 | Carlson | Oct. 1, 1935 |
| 2,221,762 | Gildersleeve | Nov. 19, 1940 |
| 2,259,892 | Hyman | Oct. 21, 1941 |
| 2,264,565 | Coultas et al. | Dec. 2, 1941 |
| 2,318,291 | Christiance | May 4, 1943 |
| 2,327,180 | Diercksmeier | Aug. 17, 1943 |
| 2,340,084 | Scranton | Jan. 25, 1944 |
| 2,351,611 | Hammond | June 20, 1944 |
| 2,408,939 | Magee | Oct. 8, 1946 |
| 2,447,122 | Horst, Jr. | Aug. 17, 1948 |
| 2,494,080 | Andrews et al. | Jan. 10, 1950 |